March 22, 1932.   E. W. McCARTHY   1,850,115
EDUCATIONAL TOY
Filed Aug. 28, 1929
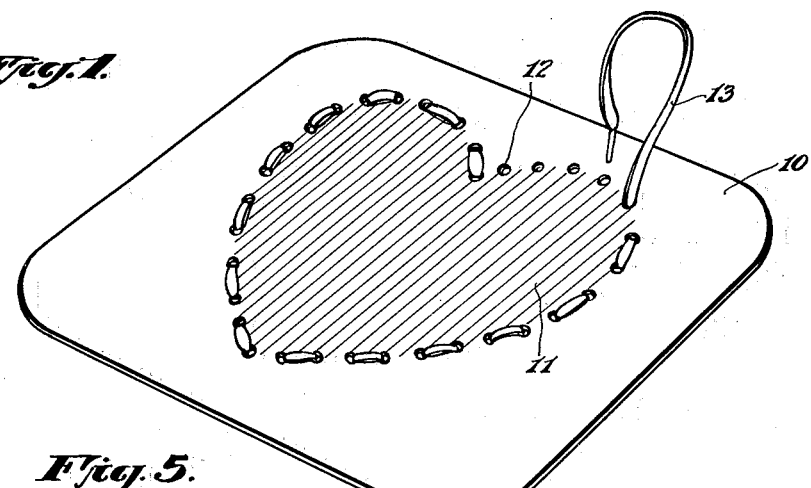
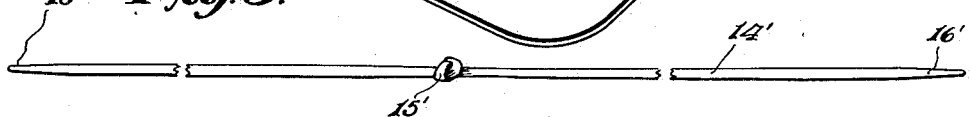
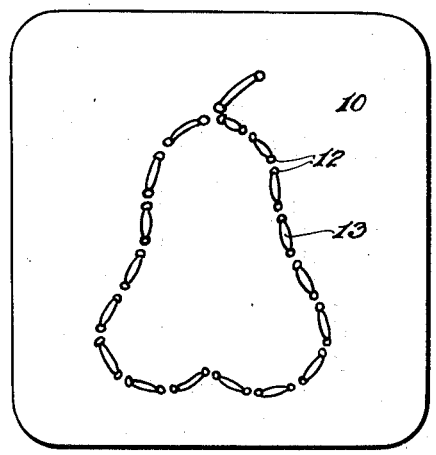
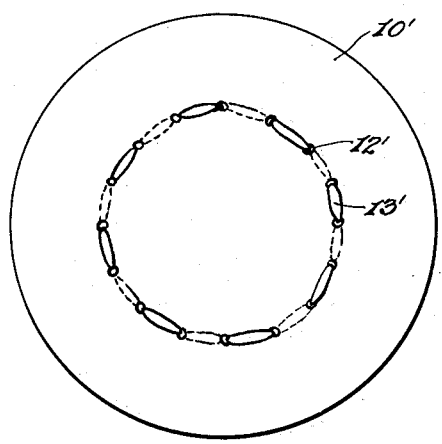
Inventor
EDWARD W. McCARTHY.
By Clarence A. O'Brien
Attorney Patented Mar. 22, 1932

1,850,115

UNITED STATES PATENT OFFICE

EDWARD W. McCARTHY, OF BUFFALO, NEW YORK

EDUCATIONAL TOY

Application filed August 28, 1929. Serial No. 388,988.

This invention relates to educational toys for children.

The primary object of the invention resides in an educational toy by which a child may be taught the art of sewing and find amusement and entertainment therein, the toy consisting of a cardboard or like base having spaced openings therein which form the outline of the subject, and through which openings a flexible lace, string or the like is threaded or interlaced, the interlaced string or lace serving to distinctly bring out the subject.

Another object of the invention is to provide a stiff cardboard base which may be of any configuration in which the subject or object may be stamped or printed thereon while the outline is perforated with an uneven number of openings by which the lacing may be interlaced by a single interlacing operation to provide a broken laced outline of the subject, or carried around for a second interlacing operation to produce a continuous laced outline, at the option of the child.

A further object is the provision of an educational toy which is simple of construction, easy to learn the working thereof, and which is safe for use by even the youngest child.

With these and other objects in view, the invention resides in the certain novel construction, combination and arrangement of parts, the essential features of which are hereinafter fully described, are particularly pointed out in the appended claims and are illustrated in the accompanying drawings; in which:

Figure 1 is a perspective view of my invention showing the openings in the card in even spaced relation.

Figure 2 is a vertical sectional view therethrough.

Figure 3 is a plan view showing the openings arranged in pairs.

Figure 4 is a plan view showing a circular shaped base or card.

Figure 5 is a detail elevational view of one form of lace.

Figure 6 is a detail vertical sectional view showing one method of interlacing.

Referring more particularly to the drawings, the reference character 10 designates a card board or like stiff base which may be of any configuration and in Figure 1 of the drawings the same is shown as square with rounded corners so as not to provide any sharp edges which might tend to injure the child during working of the toy. Stamped upon one face of the base 10 is the outline or design of the object, subject or picture to be formed, and in the present instance the shaded lines 11 represent the printed or stamped colored figure which is shown as a heart. The border of the picture is provided with an uneven number of openings or apertures 12 which in this case are in even spaced relation and through which a flexible element 13 in the nature of a shoe lace, or string is threaded. In Figures 1 and 2, the flexible element is shown in the form of a shoe lace which is knotted at one end as at 14 and pointed by waxing the end or by applying a metal point 15 thereto for facilitating the easy insertion of the lace through the respective openings in the card.

With reference to Figures 1 and 2 of the drawings, it will be seen that the lace or flexible element 13 is inserted first through one of the openings 12 and through and under the card on the next adjacent insertion whereupon threading of the lace once around will produce a broken outline as shown in the drawings. However, should the lace be carried around for a second threading operation, a continuous outline will be produced.

In Figure 3 of the drawings like reference characters refer to similar parts, but in this instance the openings 12 are arranged in pairs so that the space between the exposed portions of the lace is less than the exposed portions themselves. In this instance the subject represents a pear, but it will of course be understood that any subject may be selected as is desired.

In Figure 4 I have shown the cardboard base 10′ as round in place, and the openings 12′ produce a circular design, the dotted lines in the said figure representing that portion of the lace 13′ which is disposed on the under side of the card.

In Figure 5 a modified form of lace is shown as at 14' which is knotted at its center as at 15' and pointed at its ends as at 16. It will be appreciated that when one end 16 of the lace is inserted upward through one of the openings, the passage of the lace will be limited whereupon two free ends are provided which may be laced through the card, and upon the completion of the lacing the respective ends 16 may be tied together. When using the lace with the knot in approximately the mid point of the lace, the lace may be inserted through an aperture in the card until the knot abuts against one face of the sheet, and both ends of the lace are then threaded in opposite directions through the next adjacent aperture, then through the next adjacent aperture, and so on along the row of apertures, the lace ends passing alternately over opposite faces of the sheet between apertures, with the lace providing a continuous line on both faces of the sheet, instead of a broken line, as shown in Fig. 1.

In Figure 6 of the drawings I have shown the openings 12 arranged in pairs as shown in Figure 3, but in which the lacing 13 is brought through and under each pair to provide a loop and wherein the lacing of the front face is continuous.

From the foregoing description, it will be appreciated that I have provided an educational toy which will prove amusing and entertaining to children of all ages, and which in itself is harmless as there are no sharp points or edges which might prove injurious to a child during the working of the toy.

It might be stated that by use of a toy of this kind, a child is given the fundamental in the art of sewing.

Having thus described the invention, what I claim as new and desire to secure by Letters Patent is:—

1. An educational toy for children of preschool age, comprising a sheet having, upon a face thereof, a clearly defined picture with its outline defined by a row of apertures and a flexible lace having a stiffened end as a permanent part thereof which may be threaded through the apertures in succession along the said row to accentuate the outline, and with the outline guiding the child as to the order of the apertures through which the lace is to be threaded.

2. An educational toy for children of preschool age, comprising a sheet having, upon a face thereof, a clearly defined picture of a selected simple object with which children of pre-school age are familiar, and having a row of apertures along its outline, each aperture having a diameter large enough to permit free threading of a flexible lace therethrough, whereby a flexible lace may be threaded through the apertures in succession along the row by a child with the guidance of the outlines, to accentuate the outlines and teach the child the rudiments of sewing and the distinguishing characteristics of different subjects.

3. An educational toy for children of preschool age, comprising a sheet having upon a face thereof a clearly defined pictorial representation of a selected subject with a row of apertures along some of the defining lines of the representation, there being an uneven number of apertures in each row, whereby a flexible lace may be threaded through the apertures in succession along the lines, and then threaded through the apertures in the opposite direction to produce a substantially continuous and unbroken accentuated line upon both faces of the sheet.

4. An educational toy for children of preschool age, comprising a sheet having upon a face thereof a clearly defined pictorial representation of a selected subject, with a row of an uneven number of apertures along some of the defining lines of the representation, and a flexible lace having a stiffened terminal which may be threaded through the apertures in succession along the apertured defining lines to accentuate those lines, and having a length sufficient to be threaded through said apertures along the row in one direction and also then in a reverse direction through said apertures and along said row, whereby the accentuated line will be substantially unbroken on both faces of the sheet.

5. An educational toy for children of preschool age, comprising a sheet having upon a face thereof a clearly defined pictorial representation of a selected subject, with a row of apertures along some of the defining lines of the representation, and a flexible lace having a knot approximately midway of its length, whereby the ends of the lace may be threaded through said apertures in opposite directions and along opposite faces of the sheet alternately, to accentuate said lines upon both faces of the sheet, and with the lines guiding the child as to the order of the apertures through which the lace is to be threaded.

6. An educational toy for children of preschool age, comprising a sheet having upon a face thereof a clearly defined pictorial representation of a selected subject, with a row of apertures along some of the defining lines of the representation, and a flexible lace having an enlarged section forming an abutment approximately midway of its length, whereby the ends of the lace may be threaded through said apertures in opposite directions and along opposite faces of the sheet alternately, to accentuate said lines upon both faces of the sheet, and with the lines guiding the child as to the order of the apertures through which the lace is to be threaded.

7. An educational toy for children of preschool age, comprising a sheet having upon a face thereof a clearly defined picture in color of a selected simple object with which children of pre-school age are familiar, with a row of apertures along the outline of the picture through which apertures a flexible lace may be threaded in succession to accentuate said outline.

8. An educational toy for children of pre-school age comprising a sheet having, upon a face thereof, a clearly defined picture of a selected subject with which a child of pre-school age is familiar, with a row of apertures along the outline, and a flexible lace which may be threaded through the apertures in succession along said outline to accentuate the same, and with such outline guiding the child as to the order of the apertures through which the lace is to be threaded, the lace having a stiffened, blunt terminal tip permanently attached thereto to facilitate the threading of the lace through the apertures.

In testimony whereof I affix my signature.

EDWARD W. McCARTHY.